(No Model.) E. J. O'CONNOR. 2 Sheets—Sheet 1.
BICYCLE.
No. 519,024. Patented May 1, 1894.
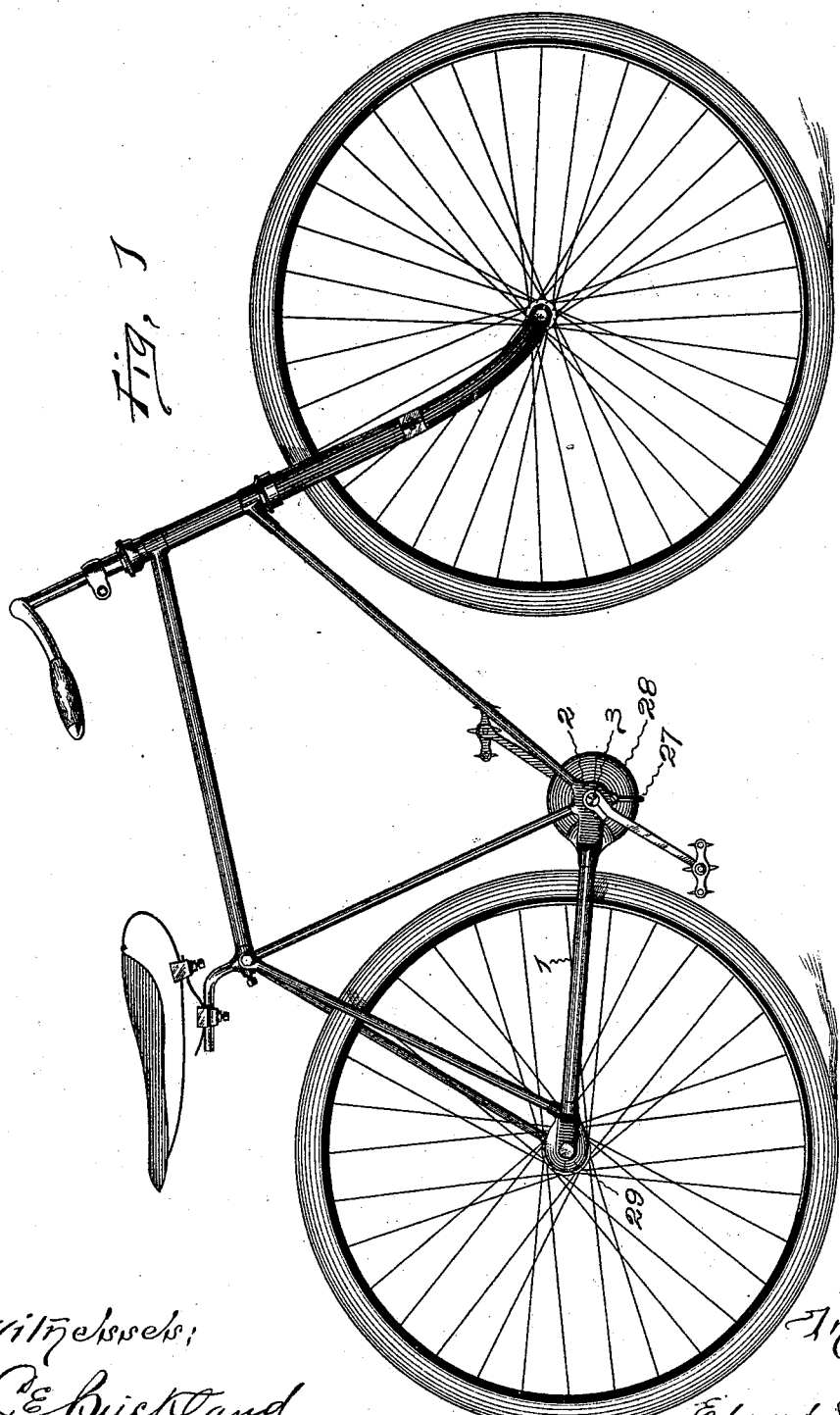
Witnesses:
C. E. Buckland,
P. A. Phelps.
Inventor:
Edward J. O'Connor,
by Harry P. Williams
Atty.

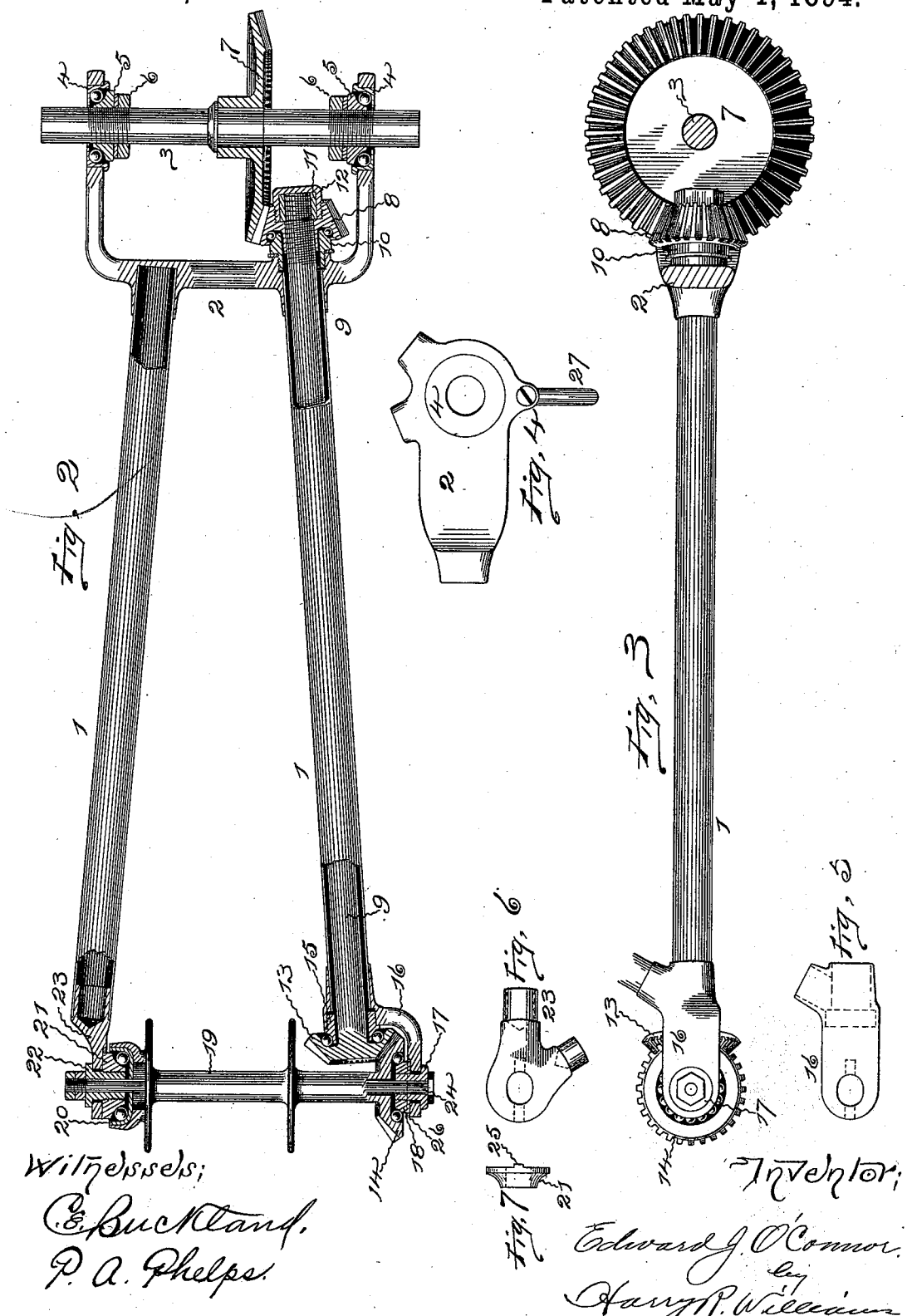

UNITED STATES PATENT OFFICE.

EDWARD J. O'CONNOR, OF HARTFORD, CONNECTICUT, ASSIGNOR, BY MESNE ASSIGNMENTS, TO AUSTIN BRAINARD, OF SAME PLACE.

BICYCLE.

SPECIFICATION forming part of Letters Patent No. 519,024, dated May 1, 1894.

Application filed April 17, 1893. Serial No. 470,632. (No model.)

*To all whom it may concern:*

Be it known that I, EDWARD J. O'CONNOR, a citizen of the United States, residing at Hartford, in the county of Hartford and State of Connecticut, have invented certain new and useful Improvements in Bicycles, of which the following is a full, clear, and exact specification.

The invention relates to the driving mechanism of the class of chainless safety bicycles, and the object is to provide an easy running and noiseless driving mechanism for such machines which while simple and cheap will be strong, durable and readily adjustable.

To this end the invention resides in details of the construction and arrangement of the parts making up the driving mechanism of such a machine, as more particularly hereinafter described and pointed out in the claims.

Referring to the accompanying drawings, Figure 1 is a side view of a machine embodying the improvements. Fig. 2 is an enlarged plan of the driving mechanism, with parts cut in section to show the construction. Fig. 3 is a side view of the same, with parts broken away. Fig. 4 is a side view of the yoke that is attached to the frame for supporting the pedal shaft. Fig. 5 is a side view of one of the brackets that are attached to the frame for supporting the driving wheel axle. Fig. 6 is a similar view of the opposite bracket; and Fig. 7 is a detail view of one of the ball cones used with these latter brackets.

The tubular frame shown in the drawings is mounted on any ordinary wheels, and provided with the usual seat, steering fork and handles of a common safety bicycle. In front of the driving wheel the lower side tubes 1 of the frame, are connected with a yoke 2 that has bearings for the shaft 3 to the ends of which the pedal cranks are attached. The ends of the yoke are perforated, and in these perforations are placed hardened ball cups 4 that are flanged so that when in position in the perforations in the ends of the yoke, they cannot be forced through by pressure from the inside. The crank shaft is threaded so that the cones 5 may be easily adjusted against the balls in the cups, which cones are locked in position after adjustment, by means of clamping nuts 6, washers usually being placed between the nuts and the cones. Borne by the shaft, near the middle of the fork, is a bevel gear 7 that meshes with a bevel pinion 8 secured to a shaft 9 that passes through one of the side tubes 1. The end of this connecting shaft 9 is provided with both a right and left hand thread, and the hub of the pinion 8 is threaded and screwed upon one of the threads cut upon the end of the shaft. Screwed into a threaded socket adjacent to the front end of the shaft is a hollow cone 10, and between the tapering end of this cone and the back of the pinion 8, which is made hollow, or cupped, are placed anti-friction balls, which form the bearing for this end of the connecting shaft, the pinion being screwed upon the shaft until the proper adjustment of the balls is obtained. A sleeve 11 is screwed upon the other thread upon the end of the shaft against the face of the pinion, to prevent it from moving forward, and a hollow nut 12, with an exterior thread is screwed into an interiorly threaded socket in the pinion to hold it tightly against the end of the sleeve. By means of this construction the pinion is adjustably held very securely to the end of the shaft.

Formed integral with, or secured to the end of the shaft 9, at the other end, in front of the hub of the driving wheel, is a bevel gear 13 that meshes with an inward facing bevel gear 14. The back of the gear 13 that is in front of the hub of the driving wheel, is hollowed out; and between it and the cone 15, screwed into a threaded socket in the end of the bracket 16 that is secured to the end of the tube 1, are placed the anti-friction balls which form the bearing for this end of the connecting shaft. After the pinion 8 has been adjusted properly with relation to the gear 7 and held by means of the threaded sleeve 11 and hollow nut 12, its ball bearings are adjusted by means of the movable cone 10; then the bearings at the opposite end of the shaft 9 are adjusted by means of the cone 15, so that the bearings are held tight, with the gear and pinion in perfect mesh.

The bracket 16 curves out and back from the end of the side tube, and its rear end is provided with an oblong perforation, through which passes a hollow bolt 17 the shank of which is slightly smaller in diameter than the longest diameter of the perforation through the end of the bracket. A nut 18, having a conical inner end screws upon this bolt; and between the conical end of the nut and the walls of a recess in the outside or back face of the gear 14, are placed anti-friction balls which form the bearings for this end of the hub of the driving wheel. The gear 14 is formed integral with or secured to the end of the hollow wheel-hub 19, to the disks of which the spokes of the wheel are fastened in the usual manner. In a recess in the opposite end of this hub, is secured a ball cup 20, between which and the conical end of the nut 21 are placed the balls that form the bearing for this end. The nut 21 is screwed upon the hollow bolt 22 that passes through the oblong perforation in the end of the bracket 23 formed integral with or secured to the end of the side tube. A tie rod 24 with a head at one end and set and clamp nuts at the other, passes through the hollow bolts 17 and 22 and the hub of the wheel to hold the parts together. To adjust the parts, the wear of the balls and the meshing of the gears at this end, the set nut on this tie rod is screwed to the correct position, and then the clamp nut is tightened against it, so as to prevent its turning loose. This clamps the parts together. On the backs of the cone-nuts 18 and 21, are formed lugs 25 that fit into grooves 26 on the inner faces of the brackets 16 and 23. These lugs prevent the cones from turning when the bolts are being tightened, and also permit them to be moved forward or backward when the bolts are loosened, for, as above stated, the perforations in the ends of the brackets through which the bolts pass are longer in diameter than the diameter of the bolts. This permits the free and easy adjustment of the hub which bears the gear 14, forward or backward when the bolts are loosened so that the gears will mesh properly. The brackets 16 and 23 may of course be formed integral with the ends of the tubes which make up the side frame, or may be secured thereto as shown; and to these brackets are secured the upright braces of the frame.

The yoke 2 is formed so as to receive the middle and front braces of the frame, and it is also preferably held together or stiffened by means of a tie rod 27, that passes from one side to the other beneath the gears. Dust guards 28 and 29 are placed over the gears at the crank shaft and at the rear wheel, to protect the parts from dust, sand and the elements, so that they will keep clean and work freely.

I claim as my invention—

1. In combination in a driving mechanism for bicycles, a crank shaft with a gear supported by the frame, a connecting shaft supported in a part of the tubular frame, one end of said shaft bearing a pinion in mesh with a gear on the crank shaft, said pinion being supported upon balls and fastened to the shaft by means of an adjusting sleeve and locking nut on the end of the shaft in front of the pinion, the opposite end of the shaft bearing a gear in mesh with a gear on the hub of the driving wheel, substantially as specified.

2. In combination in a driving mechanism for bicycles, a crank shaft with a gear supported by the frame, a connecting shaft supported in a part of the tubular frame, one end of said shaft bearing a pinion in mesh with the gear, said pinion being supported upon balls, a sleeve with an interior thread screwed upon the end of the shaft, a hollow nut with an exterior thread screwed into a socket in the pinion over the sleeve, the opposite end of the shaft bearing a gear in mesh with a gear on the hub of the driving wheel, substantially as specified.

3. In combination in a driving mechanism for bicycles, a crank shaft with a gear supported by the frame, between the shaft bearings a connecting shaft shorter in length than the distance between the crank shaft and the hub of the driving wheel supported in a part of the tubular frame, said shaft bearing at one end a pinion in mesh with the gear on the crank shaft and bearing at the other end in front of the hub of the driving wheel a gear in mesh with a gear on an extension of the hub of the driving wheel which latter gear is outside the former, substantially as specified.

4. In combination in a driving mechanism for bicycles, a crank shaft with a gear supported by the frame, a connecting shaft supported by the frame and bearing at one end a pinion in mesh with the gear on the crank shaft, and bearing at the opposite end a rearwardly facing gear in mesh with an inwardly facing gear on the hub of the driving wheel, substantially as specified.

5. In combination in a driving mechanism for bicycles, a crank shaft with a gear supported by the frame, a connecting shaft supported in a part of the frame and bearing at one end a pinion in mesh with the gear on the crank shaft and at the opposite end a gear in mesh with a gear on the hub of the driving wheel, brackets projecting from the ends of the lower side tubes of the frame to the axle of the driving wheel, said brackets having oblong slots, a tie rod passing through the oblong slots, and adjustable cones connected by the tie rod for holding anti-friction balls in contact with portions of the hub of the driving wheel, substantially as specified.

6. In combination in a driving mechanism for bicycles, a crank shaft with a gear supported by the frame, a connecting shaft supported in a part of the frame and bearing at one end a pinion in mesh with the gear on the crank shaft and at the opposite end a gear in mesh with a gear on the hub of the driving wheel, brackets projecting from the ends of the lower side tubes of the frame, said brackets having oblong slots and longitudinal mortises, cones held to the ends of the brackets in the mortises, and balls between the cones and portions of the hub of the driving wheel, substantially as specified.

7. In a driving mechanism for bicycles, a crank shaft with a gear supported by the frame, a connecting shaft supported in a portion of the frame and bearing at one end a pinion in mesh with a gear on the crank shaft and at the opposite end a gear in mesh with a gear on the hub of the driving wheel, brackets projecting from the ends of the lower side tubes of the frame, studs passing through the ends of the brackets, cones adjustably mounted on these studs, and a tie rod passing through the hollow hub and both of the cone-bearing studs in the ends of the brackets, said rod holding together the independent cone studs and the brackets, substantially as specified.

EDWARD J. O'CONNOR.

Witnesses:
H. R. WILLIAMS,
C. E. BUCKLAND.